(12) United States Patent
Kiyota (10) Patent No.: US 12,546,162 B2
(45) Date of Patent: Feb. 10, 2026

(54) SPACER FOR DOUBLE-LAYER GLASS AND DOUBLE-LAYER GLASS

(71) Applicant: KYOCERA CORPORATION, Kyoto (JP)

(72) Inventor: Satoshi Kiyota, Higashiomi (JP)

(73) Assignee: KYOCERA Corporation, Kyoto (JP)

( * ) Notice: Subject to any disclaimer, the term of this patent is extended or adjusted under 35 U.S.C. 154(b) by 791 days.

(21) Appl. No.: 17/794,243

(22) PCT Filed: Jan. 19, 2021

(86) PCT No.: PCT/JP2021/001690
§ 371 (c)(1),
(2) Date: Jul. 20, 2022

(87) PCT Pub. No.: WO2021/149684
PCT Pub. Date: Jul. 29, 2021

(65) Prior Publication Data
US 2023/0080557 A1  Mar. 16, 2023

(30) Foreign Application Priority Data

Jan. 20, 2020 (JP) ................... 2020-007004

(51) Int. Cl.
| | | |
|---|---|---|
| *E06B 3/66* | (2006.01) |
| *C03C 3/14* | (2006.01) |
| *C03C 8/04* | (2006.01) |
| *C03C 27/10* | (2006.01) |
| *E06B 3/663* | (2006.01) |
| *E06B 3/67* | (2006.01) |

(52) U.S. Cl.
CPC .............. *E06B 3/6612* (2013.01); *C03C 3/14* (2013.01); *C03C 8/04* (2013.01); *C03C 27/10* (2013.01); *E06B 3/663* (2013.01); *E06B 3/67* (2013.01)

(58) Field of Classification Search
CPC .... E06B 3/6612; E06B 3/663; E06B 3/66304; Y02A 30/249; Y02B 80/22
See application file for complete search history.

(56) References Cited

U.S. PATENT DOCUMENTS

| | | |
|---|---|---|
| 6,966,208 B1 | 11/2005 | Collins |
| 2013/0309425 A1 | 11/2013 | Dennis et al. |
| 2014/0335291 A1 | 11/2014 | Hasegawa et al. |
| 2016/0160555 A1 | 6/2016 | Petit |
| 2016/0297706 A1 | 10/2016 | Naito et al. |
| 2018/0066469 A1* | 3/2018 | Vogel-Martin ...... E06B 3/66304 |

FOREIGN PATENT DOCUMENTS

| | | |
|---|---|---|
| JP | 20171949 A | 1/2017 |
| JP | 2018504362 A | 2/2018 |
| JP | 2018104280 A | 7/2018 |

* cited by examiner

*Primary Examiner* — Laura A Auer
(74) *Attorney, Agent, or Firm* — Procopio, Cory, Hargreaves & Savitch LLP (57) ABSTRACT

A spacer is interposed between a pair of glass substrates facing each other. The spacer is disposed in contact with the pair of glass substrates. The spacer includes a center portion having a plate shape or a columnar shape, and both end portions protruding from both end surfaces of the center portion. At least one of the both end portions has a spherical cap shape, or a spherical zone shape or a truncated conical shape. A radius A of a base portion at each of the both end portions is equal to a radius B of the center portion, or is smaller than the radius B.

20 Claims, 7 Drawing Sheets

SPACER FOR DOUBLE-LAYER GLASS AND DOUBLE-LAYER GLASS

TECHNICAL FIELD

The present disclosure relates to a spacer to be used in a double-layer glass in which a pair of glass substrates are layered with a depressurized space interposed between the pair of glass substrates, and the double-layer glass.

BACKGROUND OF INVENTION

In a known double-layer glass, a pair of glass substrates are disposed facing each other, and both the glass substrates are sealed at outer peripheral parts thereof with a sealing material to generate a space therein, and then depressurization is performed by exhausting air inside the space. In such a double-layer glass, a gap between a pair of glass substrates is held, and a plurality of spacers are interposed between the glass substrates to prevent the glass substrates from being broken due to depressurization.

Patent Document 1 describes a spacer made by using a material such as a solder glass, a ceramic, a metal, and a polymer, the spacer having a shape such as a cylindrical shape, and a spherical shape.

Additionally, Patent Document 2 describes a spacer having a columnar shape.

CITATION LIST

Patent Literature

Patent Document 1: JP 2018-104280 A
Patent Document 2: JP 2017-1949 A

SUMMARY

In an aspect of the present disclosure, a spacer is interposed between a pair of glass substrates facing each other, is disposed in contact with the pair of glass substrates, and includes a center portion having a plate shape or a columnar shape, and both end portions protruding from both end surfaces of the center portion. At least any-one of the both end portions has a spherical cap shape, a spherical zone shape, or a truncated conical shape. A radius A of a base portion at each of the both end portions is equal to a radius B of the center portion, or is smaller than the radius B.

In an aspect of the present disclosure, a double-layer glass includes a first glass substrate, a second glass substrate disposed facing the first glass substrate with the above-described spacer interposed between the first glass substrate and the second glass substrate, and a sealing portion configured to seal a peripheral edge portion of an internal space formed by the first glass substrate and the second glass substrate.

DESCRIPTION OF EMBODIMENTS

Figure 1:
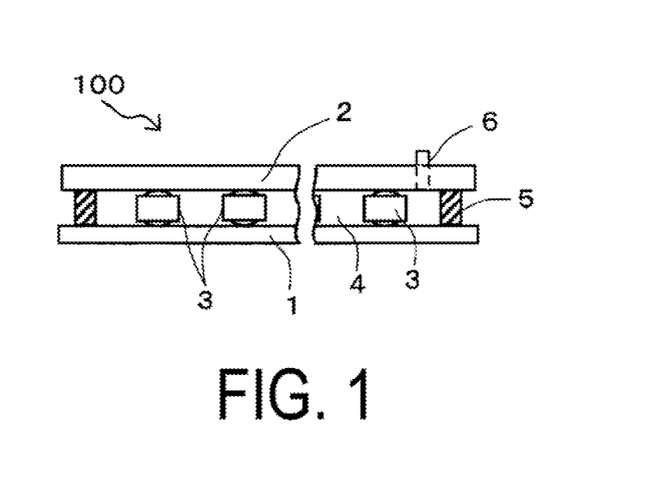
FIG. 1 is a schematic cross-sectional view of a double-layer glass according to an embodiment of the present disclosure.
Figure 2A:
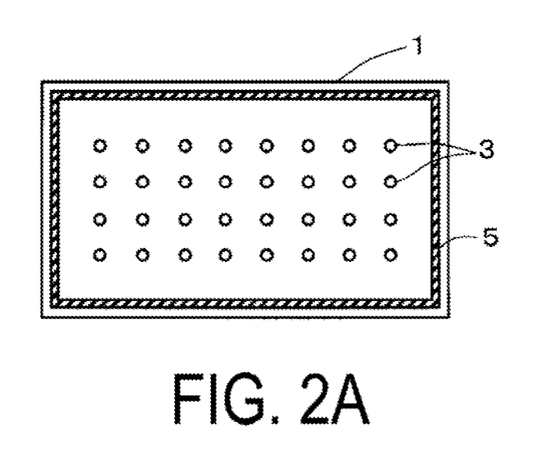
FIG. 2A is a schematic plan view illustrating a first glass substrate mounted with a plurality of spacers on a surface thereof in the double-layer glass illustrated in FIG. 1.
Figure 2B:
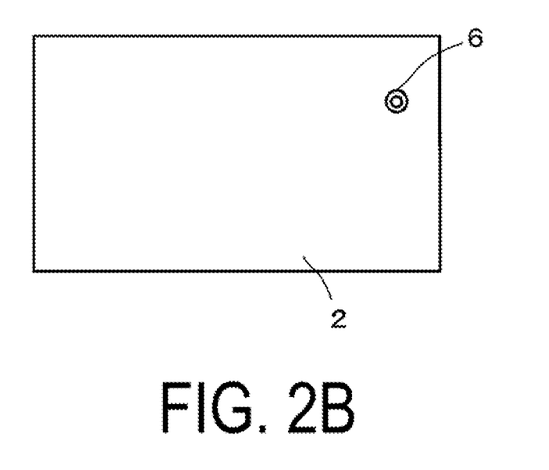
FIG. 2B is a schematic plan view illustrating a second glass substrate in the double-layer glass illustrated in FIG. 1.

The present disclosure provides a spacer for a double-layer glass that improves a thermal insulation property of the double-layer glass by reducing contact areas with glass substrates, and that is easily attached, and the double-layer glass. Hereinafter, the spacer for the double-layer glass and the double-layer glass according to an embodiment of the present disclosure will be described with reference to the accompanying drawings. FIG. 1 is a schematic cross-sectional view of the double-layer glass, and FIGS. 2A and 2B are schematic plan views illustrating a state in which a plurality of spacers are mounted on a surface of a first glass substrate.

As illustrated in FIG. 1, in the present embodiment, a double-layer glass 100 includes a first glass substrate 1, a second glass substrate 2 facing the first glass substrate 1 with a spacer 3 interposed therebetween, and a sealing portion 5 configured to seal a peripheral edge portion of an internal space 4 formed by the first glass substrate 1 and the second glass substrate 2. The second glass substrate 2 is provided with an exhaust pipe 6 to exhaust air in the internal space 4 from an exhaust port of the exhaust pipe 6.

As the first glass substrate 1 and the second glass substrate 2, a glass plate having a rectangular and flat plate shape can be used, and examples of the glass plate include a float glass such as a toughened glass. Thicknesses of the first glass substrate 1 and the second glass substrate 2 are preferably equal to or greater than 1 mm and equal to or smaller than 5 mm, but are not particularly limited.

The spacer 3 is interposed between the first glass substrate 1 and the second glass substrate 2 (hereinafter, may be referred to as the pair of glass substrates 1 and 2) facing each other, and is disposed in contact with the pair of glass substrates 1 and 2. Thus, the internal space 4 that is a gap between the pair of glass substrates 1 and 2 is held, thereby preventing the glass substrates 1 and 2 from being broken due to depressurization.

Accordingly, a plurality of spacers 3 are disposed between the first glass substrate 1 and the second glass substrate 2 at predetermined intervals. The arrangement interval of the spacers 3 is preferably, for example, a pitch from 1 to 3 cm.

As illustrated in FIG. 2A, the plurality of spacers 3 are placed on the surface of the first glass substrate 1 at predetermined intervals. In this case, the surface of the first glass substrate 1 is horizontally held. Thus, when the spacer 3 is placed on the surface of the first glass substrate 1 at a predetermined position, the spacer 3 is prevented from unexpectedly moving. Note that, as necessary, the spacer 3 may be adhered to the surface of the first glass substrate 1.

The sealing portion 5 provided at an outer peripheral edge portion of the first glass substrate 1 is provided over the entire circumference of the outer peripheral edge portion of the first glass substrate 1, and a height thereof is the same as that of the spacer 3. The sealing portion 5 can be formed, for example, by applying a glass frit.

The second glass substrate 2 has the same dimensions as those of the first glass substrate 1, as illustrated in FIG. 2B, and is caused to overlap the surface of the first glass substrate 1 on which the spacers 3 and the sealing portion 5 are formed and disposed. In this state, by exhausting air from the exhaust pipe 6, the internal space 4 formed by the first glass substrate 1 and the second glass substrate 2 and the sealing portion 5 is kept in a depressurized state.

Figure 3A:
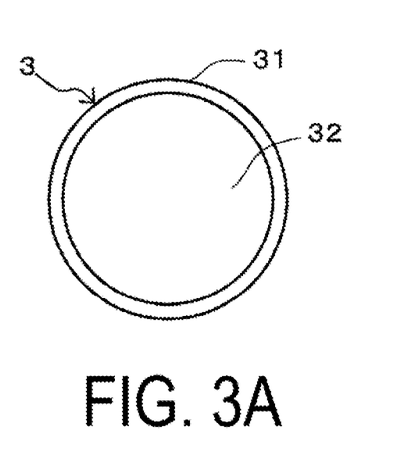
FIG. 3A is a plan view illustrating a spacer according to an embodiment of the present disclosure.
Figure 3B:
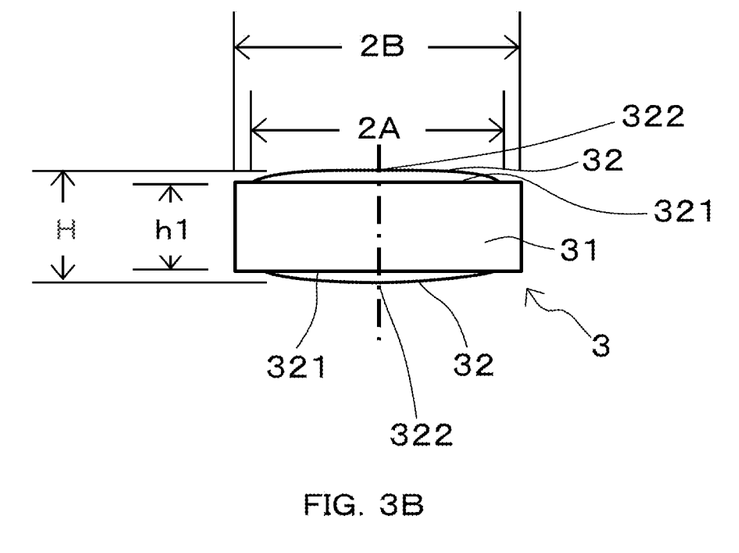
FIG. 3B is a side view of the spacer illustrated in FIG. 3A.

As illustrated in FIGS. 3A and 3B, the spacer 3 includes a center portion 31 and both end portions 32 and 32 protruding from both end surfaces of the center portion 31. The center portion 31 has a disc shape or a cylindrical shape. The both end portions 32 and 32 have a spherical cap shape. Here, the spherical cap refers to a part of a spherical body cut by a plane. Thus, the spacer 3 is brought into point contact with the first glass substrate 1 and the second glass substrate 2, and thus, the thermal insulation property of the double-layer glass 100 can be enhanced.

In contrast, when the spacer has a cylindrical shape, contact areas between both the end surfaces of the spacer and the glass substrates increase, and the thermal insulation property becomes inferior. When the spacer has a cylindrically tubular shape, the glass substrate placed at the top side after the spacers are mounted easily deflects the spacers, and thus, long-term use of the double-layer glass makes the outer surface of the glass substrate more likely to be undulated.

The planar shape of the center portion 31 of the spacer 3 may be a polygonal shape such as an elliptical shape, a quadrilateral shape, or a hexagonal shape, in addition to the disc shape or the cylindrical shape.

A height H (see FIG. 3B) of the spacer 3 defining the gap between the first glass substrate 1 and the second glass substrate 2 is typically approximately from 0.1 to 1.0 mm. A height h1 of the center portion 31 is equal to or greater than 40% with respect to a height H of the spacer 3, is preferably equal to or greater than 60%, and is more preferably equal to or greater than 70%, and the upper limit is equal to or smaller than 95%, and is preferably equal to or smaller than 90%. This prevents the spacer 3 from inadvertently rolling like a spherical body.

The radius A of the base portion 321 of each of the both end portions 32 and 32 (however, FIG. 3B illustrates a diameter 2A, instead) is smaller than the radius B of the center portion (however, FIG. 3B illustrates a diameter 2B, instead). As a result, the center portion 31 has a structure that extends in a radial direction with respect to the both end portions 32 and 32, and thus, the spacer 3 does not roll when mounted on the first and second glass substrates 1 and 2, thereby allowing the spacer 3 to be easily mounted.

Specifically, the radius B of the center portion 31 is equal to or greater than 1.1 times the radius A of the base portion 321 of each of the both end portions 32 and 32, but the spacer 3 becomes less likely to roll when mounted on the glass substrates 1 and 2, allowing the spacer 3 to be easily mounted on the glass substrates 1 and 2.

Here, when the center portion 31 and the both end portions 32 and 32 are integrally formed, the base portion 321 refers to a boundary surface between the center portion 31 and one of the both end portions, and when the both end portions 32 and 32 are adhered to the center portion 31, the base portion 321 refers to a bottom surface of one of the both end portions adhered to the center portion 31.

The diameter 2B of the center portion 31 is preferably equal to or greater than twice an interval S between contact points 322 and 322 of the both end portions 32 and 32 that individually contact the pair of glass substrates. The interval S is equal to the height H of the spacer 3. As a result, a flatness rate [(2B−S)/2B] of the spacer 3 increases, and thus, the spacer 3 is less likely to roll, thereby improving the stability of mounting work of the spacer 3.

Figure 4A:
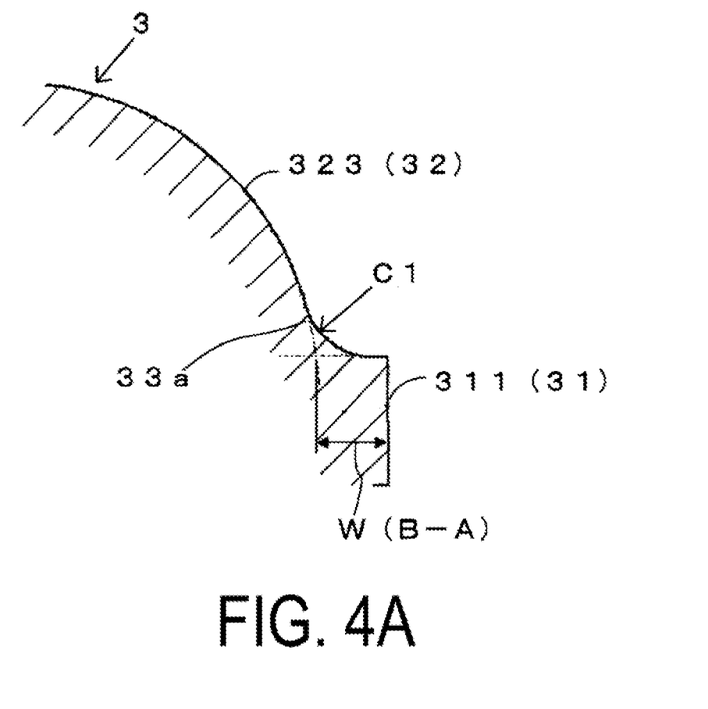
FIG. 4A is a schematic cross-sectional view illustrating an example of a connection portion between one of both end portions of the spacer and a center portion.

As illustrated in FIG. 4A, each of side surfaces 323 having a spherical shape of the both end portions 32 and 32 of the spacer 3 is connected to an end surface 311 of the both end surfaces of the center portion 31 with a curved surface 33a having a concave shape interposed therebetween. In this case, a rate C1/W of a radius C1 of the curved surface 33a with respect to a difference W between the radius A of the center portion 31 and the radius B of each of the both end portions 32 is preferably from 0.05 to 0.9.

Figure 4B:
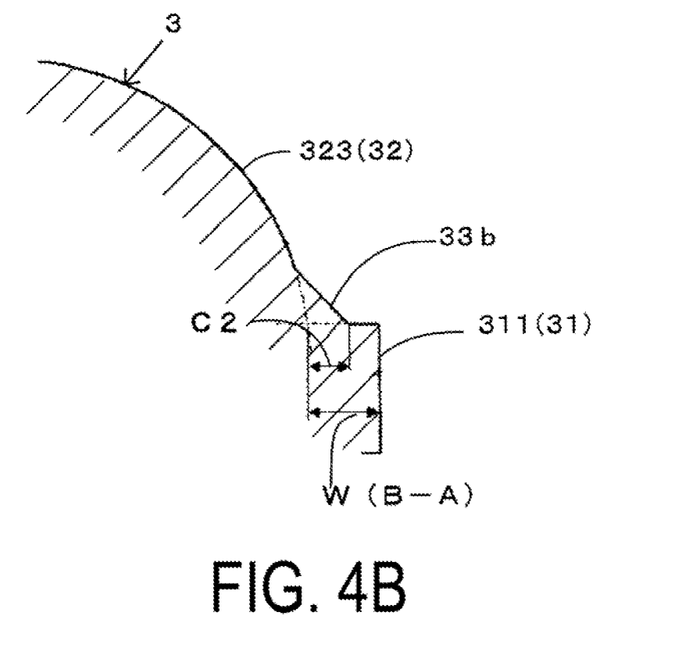
FIG. 4B is a schematic cross-sectional view illustrating another example of the connection portion between one of the both end portions of the spacer and the center portion.

Additionally, as illustrated in FIG. 4B, each of the side surfaces 323 having the spherical shape of the both end portions 32 and 32 of the spacer 3 may be connected to the end surface 311 of the both end surfaces of the center portion 31 with an inclined flat surface 33b interposed therebetween. In this case, a rate C2/W of a length C2 of the flat surface 33b in a radial direction with respect to the difference W between the radius A of the center portion 31 and the radius B of each of the both end portions 32 is preferably from 0.05 to 0.9.

In each case, stress concentration at the connection portion between each of the both end portions 32 and 32 and the center portion 31 is reduced, and thus, long-time use is available in an environment in which temperature raising and cooling are repeated.

An average value Rsk1 of kurtosis in a roughness curve of the side surface 323 having the spherical shape of at least one of the both end portions 32 and 32 may be greater than an average value Rsk2 of kurtosis in a roughness curve of an end surface of the both end surfaces of the center portion 31.

When the average value Rsk1 of the kurtosis is greater than the average value Rsk2 of the kurtosis, a contact heat resistance of the first glass substrate 1 or the second glass substrate 2 with which the both end portions 32 and 32 are in contact becomes high, and thus, the thermal insulation property of the internal space 4 is improved.

The average value Rsk2 of the kurtosis is smaller than the average value Rsk1 of the kurtosis, and thus, heat exchange between the center portion 31 and the internal space 4 is less likely to occur through the end surface, thereby stabilizing the temperature of the internal space 4. For example, the average value Rsk1 of the kurtosis is equal to or greater than 1.7 and equal to or smaller than 5.6, and the average value Rsk2 of the kurtosis is equal to or greater than 0.6 and equal to or smaller than 3.1.

The kurtosis in the roughness curve of each of the side surface 323 having the spherical shape and the end surface can be measured by using a laser microscope (manufactured by KEYENCE CORPORATION, ultra-deep color 3D profile measuring microscope (VK-X1000 or successor models thereof)) conforming to JIS B 0601: 2001.

As measurement conditions, an illumination method is set to coaxial vertical illumination, a measurement magnification is set to 480 times, a cutoff value λs is set to none, a cutoff value λc is set to 0.08 mm, a termination effect correction is set to a state of presence, and a measurement range for one position from the surface to be measured is set to 710 μm×533 μm, and it is only required to measure the kurtosis in the measurement range from the surface to be measured for each of two positions.

Further, it is preferable that surface roughness be measured by drawing four lines to be measured at substantially equal intervals in each measurement range, and then, the average values Rsk1 and Rsk2 of the kurtosis be calculated. A length per one line to be measured on the side surface 323 having the spherical shape is, for example, 300 µm. A length per one line to be measured on the end surface is, for example, 240 µm, and the tip direction is the circumferential direction.

At least one of the center portion 31 and the both end portions 32 and 32 constituting the spacer 3 includes a ceramic containing zirconium oxide, mullite, forsterite, cordierite, steatite, alkali metal aluminosilicate, aluminum titanate, zinc oxide, or eucryptite as a main constituent. The alkali metal aluminosilicate is, for example, β-spodumene.

When the ceramic contains zirconium oxide as the main constituent, the ceramic preferably has translucency.

The ceramic having the translucency is, for example, a ceramic containing, as a main constituent, zirconium oxide that forms a stabilizer of calcium oxide, magnesium oxide, yttrium oxide, scandium oxide, or cerium oxide, and lanthanum in a solid solution state.

In a case where the ceramic contains zinc oxide as a main constituent, the ceramic may contain Al at a mass percentage being equal to or greater than 1.9 mass % and equal to or smaller than 3.8 mass % in terms of oxide among 100 mass % of constituents constituting the ceramic. When Al is contained within this range, the sintering temperature can be decreased, and the thermal conductivity can be reduced.

When the ceramic contains eucryptite as a main constituent, Ti or Zr may be contained at a mass percentage being equal to or smaller than 20 mass % in terms of oxide among 100 mass % of the constituents constituting the ceramic. When Ti or Zr is contained within this range, the thermal conductivity can be reduced, and the rigidity can be enhanced.

At least one of the center portion 31 and the both end portions 32 and 32 constituting the spacer 3 may be a ceramic containing a composite compound of aluminum oxide and zirconium oxide (hereinafter, the ceramic containing the composite compound will be referred to as a composite ceramic). The composite ceramic contains, for example, a content of aluminum oxide being equal to or greater than 20 mass % and equal to or smaller than 80 mass %, and a content of zirconium oxide being equal to or smaller than 80 mass % or equal to or greater than 20 mass %. The composite ceramic may contain Si, Ti, and Mg, as oxide of each of Si, Ti, and Mg, and the total content thereof is equal to or greater than 0.6 mass % and equal to or smaller than 4.5 mass % in terms of oxide.

The composite ceramic can adjust the thermal conductivity and static modulus of elasticity indicating rigidity by adjusting each content of aluminum oxide and zirconium oxide.

The both end portions 32 and 32 may include the same ceramic as or different ceramic from that of the center portion 31, either of the both end portions 32 and 32 may include another material other than ceramic (for example, metal, resin, or the like). When one of the both end portions 32 and 32 include a material different from that of the center portion 31, the one is only required to be bonded to an end surface of the both end surfaces of the center portion 31 by bonding or the like.

Configuring the spacer 3 with the ceramic described above has advantages that the generation of outgassing from the spacer 3 can be reduced, a high thermal insulation effect can be maintained over a long period of time, and the mechanical strength can also be improved.

Here, the "main constituent" of the ceramic refers to a constituent accounting for 80 mass % or more, among 100 mass % of the constituents contained in the ceramic.

The constituents of the ceramic can be identified by using an X-ray diffractometer (XRD), and the contents can be determined by Rietveld refinement. The contents may be determined by converting the metal elements obtained by a fluorescent X-ray analyzer (XRF) or an inductively coupled plasma (ICP) emission spectrophotometer into the identified constituents.

Next, an example of a method for manufacturing the above-described spacer including the ceramic will be described.

When the spacer includes, for example, a ceramic containing zirconium oxide as a main constituent, first, zirconium oxide powder serving as the main constituent, yttrium oxide powder serving as a stabilizer, and, as necessary, a dispersing agent for dispersing the zirconium oxide powder, and a binder such as polyvinyl alcohol are wet mixed by using a barrel mill, a rotary mill, a vibration mill, a bead mill, a sand mill, an agitator mill, or the like for 40 to 50 hours to form a slurry.

Here, an average particle diameter of the zirconium oxide powder ($D_{50}$) is equal to or greater than 0.1 µm and equal to or smaller than 2.2 µm, and the content of the yttrium oxide powder in 100 mass % in total of the above-described powder is equal to or greater than 3.6 mass % and equal to or smaller than 8.8 mass %.

Next, a predetermined amount of an organic binder such as paraffin wax, polyvinyl alcohol (PVA), and polyethylene glycol (PEG) is weighed and added to the slurry. A thickening stabilizer, a dispersing agent, a pH adjusting agent, an antifoaming agent, and the like may be added.

As the stabilizer, instead of yttrium oxide ($Y_2O_3$), at least one type of powder such as cerium oxide ($CeO_2$), dysprosium oxide ($Dy_2O_3$), magnesium oxide (MgO), and calcium oxide (CaO) may be used.

When the spacer includes a ceramic containing cordierite as a main constituent, first, a synthetic cordierite powder ($2MgO \cdot 2Al_2O_3 \cdot 5SiO_2$) with an average particle diameter from 0.5 to 5 µm, a magnesium aluminate powder ($MgAl_2O_4$) with an average particle diameter from 0.5 to 3 µm, and an oxide powder of Y, Yb, Er, or Ce with an average particle diameter from 0.5 to 2 µm are prepared.

Note that the synthetic cordierite powder and the magnesium aluminate powder constitute the main constituent in the present disclosure, and the oxide powder of any one kind of Y, Yb, Er, and Ce constitutes an accessory constituent. In addition, the synthetic cordierite powder is a powder in which, except for an addition amount of the magnesium aluminate powder among 100 mass % of the main constituent, Mg in a range being equal to or greater than 11.77 mass % and equal to or smaller than 13.3 mass % in terms of oxide, Al in a range being equal to or greater than 29.1 mass % and equal to or smaller than 33.8 mass % in terms of oxide, and Si in a range being equal to or greater than 52.0 mass % and equal to or smaller than 53.6 mass % in terms of oxide are synthesized in advance.

Then, predetermined amounts of the synthetic cordierite powder and the magnesium aluminate powder, for example, an amount being equal to or greater than 93.5 mass % and equal to or smaller than 99.9 mass % of the synthetic cordierite powder, and an amount being equal to or greater than 0.01 mass % and equal to or smaller than 6.5 mass % of the magnesium aluminate powder, are weighed.

Next, with respect to 100 mass % in total of the synthetic cordierite powder and the magnesium aluminate powder, an accessory constituent is weighed so as to be in a range being equal to or greater than 4.5 mass % and equal to or smaller than 15.0 mass %, and then, is wet mixed until the average particle diameter becomes equal to or smaller than 2 µm by using a ball mill for from 5 to 30 hours to produce a slurry. An organic binder or the like may be added as described above.

Then, the slurry containing zirconium oxide powder or synthetic cordierite powder is spray-dried to produce granules.

The spacer 3 is produced by sequentially performing each process of filling and forming these granules into a forming die, and firing. As the forming process for forming the shape, pressure forming, injection molding, and the like can be adopted. A forming pressure in the pressure forming is, for example, equal to or greater than 78 MPa and equal to or smaller than 128 MPa.

It is required that in the firing, air atmosphere is set as the atmosphere in all cases, in a case where the ceramic containing zirconium oxide as the main constituent is prepared, the firing temperature is set to be equal to or higher than 1400° C. and equal to or lower than 1500° C., and in a case where the ceramic containing cordierite as the main constituent is prepared, the firing temperature is set to be equal to or higher than 1340° C. and equal to or lower than 1440° C., the holding time is set to be equal to or longer than one hour and equal to or shorter than four hours in all the cases.

The sintered body produced by the firing can be used as the spacer 3 as it is, but may be ground and/or polished as necessary. This results in the spacer 3 having a high dimensional accuracy.

The spacer 3 preferably has a porosity per unit area of the both end portions 32 and 32 being approximately 0.2% to 1% lower than that of the center portion 31. This reduces the thermal conductivity of the portion being in contact with the glass substrate while maintaining the mechanical strength. In order to measure the porosity per unit area, polishing is performed with a tin board from the end surface of one of the both end portions 32 and 32 and one end surface of the both end surfaces the center portion 31 in the respective thickness directions, for example, by using a diamond abrasive grain whose average particle diameter $D_{50}$ is 0.5 µm. Images of the polished surface obtained by the polishing are captured by using a scanning electron microscope (SEM) with a magnification of 10000 and a range to be measured with a length in the horizontal direction of 12 µm and a length in the vertical direction of 9 µm, for example. Next, the measurement range is set from the captured images, and the porosity per unit area can be determined by analysis using image analysis software (for example, WinROOF, manufactured by MITANI Corporation). For the analysis, a threshold value of equivalent circle diameters of the pores is set to 0.21 µm, and equivalent circle diameters of the pores being smaller than 0.21 µm are not targeted for the calculation of the porosity per unit area. When the porosity per unit area of the both end portions 32 and 32 is made lower than that of the center portion 31, for example, pressure during pressure forming needs to be adjusted.

Alternatively, a portion to be made as the center portion may be filled with granules described above, and portions to be made as the both end portions may be filled with granules each containing a pore forming agent such as a resin bead that is burned or thermally decomposed in the firing process.

A diameter of the pore forming agent is, for example, from 12.5 to 62.5 µm, and 2 to 10 parts by mass of the pore forming agent may be mixed with respect to total 100 parts by mass of the powder.

Next, a method for manufacturing the double-layer glass 100 will be described. First, the surface of the first glass substrate 1 is horizontally held. Next, the plurality of spacers 3 are disposed on the surface of the first glass substrate 1 at predetermined intervals, as illustrated in FIG. 2A. To do so, for example, operations may be repeated in which the spacer 3 is held by a suction means (not illustrated) including an air suction port, the spacer 3 is transported to a predetermined position on the surface of the first glass substrate 1, the suction means is then moved downward at the predetermined position to place the spacer 3 on the surface of the first glass substrate 1, the air suction is stopped in this state, and the suction means is moved upward, and is moved back to the original position to be prepared for next suction. The suction and transport of the spacer 3 may be performed for each row, or a plurality of rows may be performed at a time.

Additionally, as another method, for example, a plate (not illustrated) provided with a plurality of through-holes each of which has a size through which only one spacer 3 can pass is placed on the surface of the first glass substrate 1, and then, the plurality of spacers 3 are scattered on the plate. After the fact that the spacers 3 are fitted into all the through-holes is checked, the plate can be removed along with the excessive number of spacers 3, and the plurality of spacers 3 can be disposed on the surface of the first glass substrate 1 at predetermined intervals.

Even in any of the methods, the spacer 3 includes the center portion 31 having a disc shape or a cylindrical shape, and the both end portions 32 and 32 having the spherical cap shape and protruding from both the end surfaces of the center portion 31, and thus, the spacer 3 does not roll. Thus, when the second glass substrate 2 is overlaid on the surface of the first glass substrate 1, tip portions of the both end portions 32 and 32 can be brought into contact with both of the glass substrates 1 and 2.

As described above, after the spacers 3 are disposed on the surface of the first glass substrate 1, the sealing portion 5 is formed at the outer peripheral edge portion of the first glass substrate 1. The sealing portion 5 includes a glass frit with a low melting point, for example. As an example of the glass frit with the low melting point that is available for the sealing material 4, a bismuth-based seal frit paste containing $Bi_2O_3$ at a percentage being equal to or greater than 70%, $B_2O_3$ and ZnO each at a percentage being equal to or smaller than 15%, and a mixture of organic substances such as ethyl cellulose, and terpineol at a percentage being equal to or greater than 5% can be used.

The sealing portion 5 is obtained by applying the sealing material 4 to the outer peripheral edge portion of the first glass substrate 1, for example, by using a dispenser, and then, drying the applied sealing material 4. Next, the second glass substrate 2 is disposed on the first glass substrate 1 so as to face each other, and in this state, both the glass substrates 1 and 2 are put into a furnace and heated, and the glass frit with the low melting point is melted to seal the periphery of both the glass substrates 1 and 2 at the sealing portion 5.

Next, the air in the sealed internal space between the glass substrates 1 and 2 is discharged and depressurized through the exhaust pipe 6, for example, by using a rotary pump, or the like, and then, the exhaust port is adhered and sealed with a metal lid (not illustrated) and the like. In this way, the double-layer glass 100 is manufactured.

As described in detail above, in the embodiment of the present disclosure, in the spacer 3 for the double-layer glass, at least one of the both end portions 32 and 32 has a spherical cap shape, or a spherical zone shape or a truncated conical shape, and thus, the contact area between the glass substrates 1 and 2 is reduced, and thus, the thermal insulation property of the double-layer glass 100 can be improved. In addition, the both end portions 32 and 32 have a shape protruding from both the end surfaces of the center portion 31, and thus, the spacer 3 does not roll when the spacer 3 is mounted on the glass substrates 1 and 2, making the mounting of the spacer 3 easier.

The embodiment of the present disclosure has been described above, but the present disclosure is not limited to the embodiment described above, and various modifications and enhancements can be made. For example, the both end portions 32 and 32 may have a spherical zone shape or a truncated conical shape, as well as a spherical cap shape, as described above. Here, the spherical zone shape refers to a portion of a spherical body sandwiched by two planes when the spherical body is cut by the two planes parallel to each other. When the both end portions 32 and 32 have a spherical zone shape or a truncated conical shape, the contact between the pair of glass substrates 1 and 2 is surface contact, but as long as the thermal insulation property is not excessively reduced, the surface contact may be acceptable.

Additionally, in the embodiment described above, the radius A of the base portion 321 of each of the both end portions 32 and 32 is smaller than the radius B of the center portion 31, but the radius A of the base portion 321 and the radius B of the center portion 31 may be equal.

REFERENCE SIGNS

1 First glass substrate
2 Second glass substrate
3 Spacer
31 Center portion
32 Both end portions
321 Base portion
322 Contact point
323 Side surface having spherical shape
33a Curved surface having concave shape
33b Flat surface being inclined
4 Internal space
5 Sealing portion
6 Exhaust pipe
100 Double-layer glass

The invention claimed is:

1. A spacer interposed between, and in contact with a pair of glass substrates, the spacer comprising:
   a center portion having a plate shape or a columnar shape; and
   both end portions protruding from both end surfaces of the center portion, wherein
   at least one of the both end portions has a spherical cap shape, a spherical zone shape or a truncated conical shape,
   a radius A of a base portion at each of the both end portions is equal to or less than a radius B of the center portion, and
   a porosity per unit area of each of the both end portions is lower than that of the center portion.

2. The spacer according to claim 1, wherein
   the radius B of the center portion is greater than or equal to 1.1 times the radius A of the base portion at each of the both end portions.

3. The spacer according to claim 1, wherein
   a diameter 2B of the center portion is greater than or equal to two times an interval S between contact points of the both end portions that individually contact the pair of glass substrates.

4. The spacer according to claim 1, wherein
   at least one of the center portion and the both end portions comprises a ceramic containing zirconium oxide, mullite, forsterite, cordierite, steatite, alkali metal aluminosilicate, aluminum titanate, zinc oxide, or eucryptite, as a main constituent.

5. The spacer according to claim 1, wherein
   at least one of the center portion and the both end portions comprises a ceramic containing a composite compound of aluminum oxide and zirconium oxide.

6. A spacer interposed between, and in contact with a pair of glass substrates, the spacer comprising:
   a center portion having a plate shape or a columnar shape; and
   both end portions protruding from both end surfaces of the center portion, wherein
   at least one of the both end portions has a spherical cap shape, a spherical zone shape or a truncated conical shape,
   a radius A of a base portion at each of the both end portions is equal to or less than a radius B of the center portion,
   a side surface having a spherical shape of at least one of the both end portions having the spherical cap shape, the spherical zone shape, or the truncated conical shape is connected to an end surface of the both end surfaces of the center portion with a curved surface having a concave shape interposed between the side surface having the spherical shape and the end surface, and
   a rate C1/W of a radius C1 of the curved surface with respect to a difference W between the radius A of the center portion and the radius B of each of the both end portions is from 0.05 to 0.9.

7. A spacer interposed between, and in contact with a pair of glass substrates, the spacer comprising:
   a center portion having a plate shape or a columnar shape; and
   both end portions protruding from both end surfaces of the center portion, wherein
   at least one of the both end portions has a spherical cap shape, a spherical zone shape or a truncated conical shape,
   a radius A of a base portion at each of the both end portions is equal to or less than a radius B of the center portion,
   a side surface having a spherical shape of at least one of the both end portions having the spherical cap shape, the spherical zone shape, or the truncated conical shape is connected to an end surface of the both end surfaces of the center portion with a flat surface being inclined interposed between the side surface having the spherical shape and the end surface, and
   a rate C2/W of a length C2 of the flat surface in a radial direction with respect to a difference W between the radius A of the center portion and the radius B of each of the both end portions is from 0.05 to 0.9.

8. The spacer according to claim 1, wherein
   an average value Rsk1 of kurtosis in a roughness curve of a side surface having a spherical shape of at least one of the both end portions is greater than an average value Rsk2 of kurtosis in a roughness curve of an end surface of the both end surfaces of the center portion.

9. A double-layer glass comprising:
a first glass substrate;
a second glass substrate disposed facing the first glass substrate with the spacer according to claim 1 interposed between the first glass substrate and the second glass substrate; and
a sealing portion configured to seal a peripheral edge portion of an internal space formed by the first glass substrate and the second glass substrate.

10. The double-layer glass according to claim 9, wherein the first glass substrate or the second glass substrate comprises an exhaust port configured to exhaust air inside the internal space formed by the first glass substrate and the second glass substrate, the peripheral edge portion of the internal space being sealed by the sealing portion.

11. The spacer according to claim 6, wherein the radius B of the center portion is greater than or equal to 1.1 times the radius A of the base portion at each of the both end portions.

12. The spacer according to claim 6, wherein a diameter 2B of the center portion is greater than or equal to two times an interval S between contact points of the both end portions that individually contact the pair of glass substrates.

13. The spacer according to claim 6, wherein at least one of the center portion and the both end portions comprises a ceramic containing zirconium oxide, mullite, forsterite, cordierite, steatite, alkali metal aluminosilicate, aluminum titanate, zinc oxide, or eucryptite, as a main constituent.

14. The spacer according to claim 6, wherein at least one of the center portion and the both end portions comprises a ceramic containing a composite compound of aluminum oxide and zirconium oxide.

15. The spacer according to claim 6, wherein an average value Rsk1 of kurtosis in a roughness curve of a side surface having a spherical shape of at least one of the both end portions is greater than an average value Rsk2 of kurtosis in a roughness curve of an end surface of the both end surfaces of the center portion.

16. The spacer according to claim 7, wherein the radius B of the center portion is greater than or equal to 1.1 times the radius A of the base portion at each of the both end portions.

17. The spacer according to claim 7, wherein a diameter 2B of the center portion is greater than or equal to two times an interval S between contact points of the both end portions that individually contact the pair of glass substrates.

18. The spacer according to claim 7, wherein at least one of the center portion and the both end portions comprises a ceramic containing zirconium oxide, mullite, forsterite, cordierite, steatite, alkali metal aluminosilicate, aluminum titanate, zinc oxide, or eucryptite, as a main constituent.

19. The spacer according to claim 7, wherein at least one of the center portion and the both end portions comprises a ceramic containing a composite compound of aluminum oxide and zirconium oxide.

20. The spacer according to claim 7, wherein an average value Rsk1 of kurtosis in a roughness curve of a side surface having a spherical shape of at least one of the both end portions is greater than an average value Rsk2 of kurtosis in a roughness curve of an end surface of the both end surfaces of the center portion.

* * * * *